US012792969B2

(12) United States Patent
Tiwari

(10) Patent No.: US 12,792,969 B2
(45) Date of Patent: Nov. 10, 2026

(54) MACHINE LEARNING MODEL-BASED GENERATION OF DIGITAL PERSONAS

(71) Applicant: Disney Enterprises, Inc., Burbank, CA (US)

(72) Inventor: Sanchita Tiwari, Cumming, GA (US)

(73) Assignee: Disney Enterprises, Inc., Burbank, CA (US)

( * ) Notice: Subject to any disclaimer, the term of this patent is extended or adjusted under 35 U.S.C. 154(b) by 386 days.

(21) Appl. No.: 18/650,796

(22) Filed: Apr. 30, 2024

(65) Prior Publication Data

US 2025/0335817 A1 Oct. 30, 2025

(51) Int. Cl.
*G06N 20/00* (2019.01)

(52) U.S. Cl.
CPC .................................... *G06N 20/00* (2019.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS 10,977,452 B2 4/2021 Wang et al.
11,023,815 B2 6/2021 Acharya et al.
2022/0328038 A1* 10/2022 Otani ...................... G10L 15/18
2023/0244938 A1* 8/2023 Wei ........................ G06N 3/045 706/25
2023/0351096 A1* 11/2023 Shekhar ............... G06N 3/0455
2023/0351102 A1 11/2023 Tran
2023/0376697 A1* 11/2023 Chow .............. G06F 16/33295
2024/0176629 A1* 5/2024 Reddy ..................... G06F 9/453
2024/0354379 A1* 10/2024 Sun ....................... G06F 21/121
2025/0028744 A1* 1/2025 Sharifi ................ G06F 16/3329
2026/0141003 A1* 5/2026 Fieldman ............ G06F 16/9038

* cited by examiner

*Primary Examiner* — Hung D Le
(74) *Attorney, Agent, or Firm* — Farjami & Farjami LLP

(57) ABSTRACT

A system includes a hardware processor configured to execute a machine learning (ML) model training pipeline to train an ML model using data relevant to a world of a digital persona to provide a dialogue model, generate, using the dialogue model, first conversational outputs, train the dialogue model, based on the first conversational outputs, to avoid hallucinations and/or undesirable expressions to provide a guardrailed dialogue model, generate, using the guardrailed dialogue model, second conversational outputs, train the guardrailed dialogue model, based on the second conversational outputs and persona data identifying interaction characteristics of the digital persona to provide a persona-specific model, generate, using the persona-specific model, a response to a scripted question, determine a quality score for the response, and further train the persona-specific model or validate the persona-specific model for human interaction, depending upon whether the quality score fails to satisfy or satisfies a quality criterion.

20 Claims, 5 Drawing Sheets

MACHINE LEARNING MODEL-BASED GENERATION OF DIGITAL PERSONAS

BACKGROUND

Advances in artificial intelligence (AI) have led to the development of systems capable of interacting with a human user in a variety of ways. Large language models, for example, have shown tremendous potential in creating complex and nuanced conversations with users. However, existing large language models typically present themselves as generic interaction portals lacking a distinctive personality. As a result, and although large language models are generally successful in holding a conversation or providing requested information, they fail to project the type of persona that can encourage a user to develop an emotional connection or affinity with the persona model. Thus, imbuing a large language model with the semblance of a personality may improve the user experience and give rise to a sense of loyalty or even affection for a particular persona model.

Nevertheless, training a large language model to project a consistent personality that is substantially guard railed against hallucination and the generation of toxic, offensive, or otherwise undesirable language presents significant challenges. For instance, large language models may include well over one hundred billion parameters, and require the expenditure of enormous resource to guardrail and train. Consequently, there is a need in the art for an efficient and resource sparing solution for imbuing machine learning models such as large language models with distinctive digital personas.

DETAILED DESCRIPTION

Figure 1:
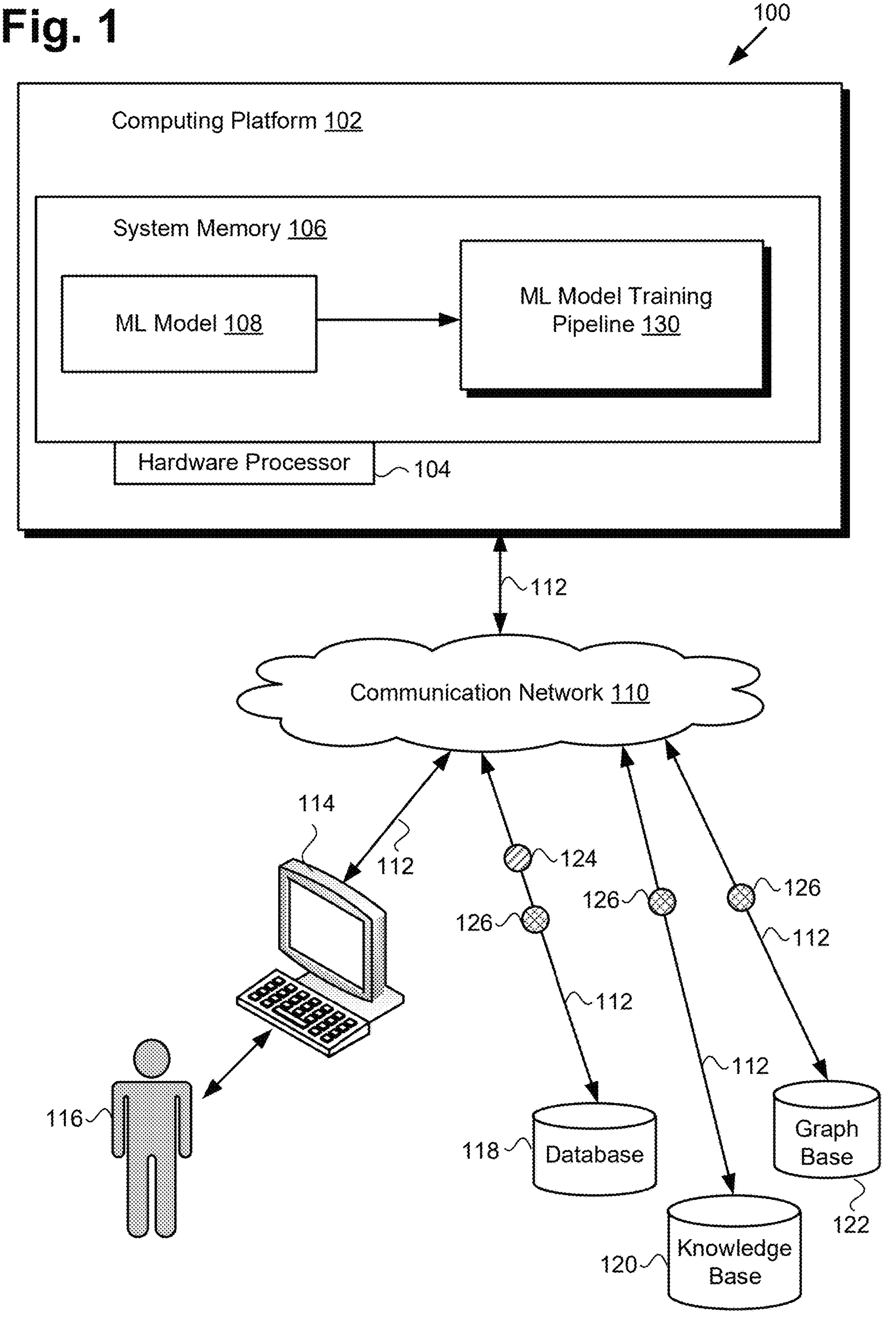
FIG. 1 shows an exemplary system for performing machine learning (ML) model-based generation of digital personas, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing machine learning (ML) model-based generation of digital personas. Moreover, in some implementations, the present solution for performing ML model-based generation of digital personas may advantageously be implemented as automated systems and method.

As used in the present application, the terms "automation," "automated" and "automating" refer to systems and processes that do not require the participation of a human system administrator. Although in some implementations the ML model based digital persona generation solution disclosed herein may be monitored or even managed by a human system designer, that human involvement is optional. Thus, the methods described in the present application may be performed under the control of hardware processing components of the disclosed systems.

In addition, as defined in the present application, a digital persona refers to a synthesized personality that enables a system projecting the digital persona to exhibit behavior and intelligence that can be perceived by a human user as a distinctive personality. A digital persona may speak with its own characteristic voice (e.g., phonation, pitch, loudness, rate, dialect, accent, rhythm, inflection and the like) such that a human interacting with the digital persona recognizes the digital persona as a unique individual. Digital personas may exhibit characteristics of living or historical characters, fictional characters from literature, film and the like, digital assistants such as customer service representatives or technical support agents, or simply unique individuals that exhibit patterns that are recognizable by humans as a personality.

Moreover, as defined in the present application, the expression "ML model" refers to a computational model for making predictions based on patterns learned from samples of data or "training data." Various learning algorithms can be used to map correlations between input data and output data. These correlations form the computational model that can be used to make future predictions on new input data. Such a predictive model may include one or more logistic regression models, Bayesian models, or artificial neural networks (NNs), large language models (LLMs), multimodal foundation models, as well as various classical artificial intelligence (AI) models, to name a few examples.

It is also noted that, as defined in the present application, the expression "guardrailed dialogue model" refers to an ML model that has undergone specific training to significantly reduce or eliminate the propensity of the trained ML model to hallucinate, or to generate toxic, offensive, or otherwise undesirable conversational responses when compared to the same model before guardrail training.

By way of overview, the present application discloses a two phase training pipeline in which a relatively small version of a generic LLM models (3B,5B,7B) that is easy to fine tune, and requires few resources to train, such as a pre-trained generic LLM having three billion, five billion, or seven billion parameters, for example. In a first training stage, the generic LLM can be trained on data that is relevant to a particular digital persona, such as the world inhabited by the digital persona, people or characters the digital persona interacts with, locations visited or referred to by the digital persona and objects used or talked about by the digital persona. This provides more relevant context around the conversations being trained for. Then, in a second training stage, the model is fine tuned for the digital persona specifically, trains the dialog model for a specific persona.

Using this two-stage training framework, the model size and training time can advantageously be substantially reduced when compared to training a conventional LLM having more than one hundred billion parameters. Using a relatively small pre-trained LLM on which to perform digital persona specific dialogue training also advantageously avoids the higher susceptibility to toxicity of larger LLMs.

FIG. 1 shows exemplary system 100 for performing ML model-based generation of digital personas, according to one implementation. As shown in FIG. 1, system 100 includes computing platform 102 having hardware processor 104, and system memory 106 implemented as a non-transitory storage medium. According to the present exemplary implementation, system memory 106 stores ML model 108, which may be pre-trained generic LLM including less than eight billion parameters for example, as well as ML model training pipeline 130 configured to train ML model 108 to project a specific digital persona in conversation.

As further shown in FIG. 1, system 100 is implemented within a use environment including communication network 110 providing network communication links 112, and one or more AI behavior models 130 (hereinafter "AI behavior model(s) 130"), which may be or include one or more multimodal foundation models and/or one or more reference resources, such as database 118, knowledge base 120 and graph base 122, for example, communicatively coupled to system 100 via communication network 110 and network communication links 112. Also shown in FIG. 1 are user system 114, system user 116 utilizing user system 114 to interact with system 100 to initiate or review training of ML model 108, dataset 124 for use in a first training stage of ML model 108, and persona data 126 specific to the digital persona ML model 108 is being trained to emulate, persona data 126 identifying interaction characteristics of that digital persona.

It is noted that database 118 may store generic conversation samples that are not associated with any one digital persona per se, conversation samples that are relevant to the world of a particular digital persona and reference one or more of people, objects, actions, or locations inhabiting the world of a particular digital persona, and conversation samples that are specific to and characteristic of a particular digital persona (hereinafter "persona-specific conversation samples"). Moreover, in addition to generic conversation samples, database 118 may store conversation samples that are relevant to the worlds of and persona-specific conversation samples for tens, hundreds, or thousands of distinctive digital personas.

Analogously, knowledge base 120 may store personality profiles and descriptions of the respective worlds inhabited by tens, hundreds, or thousands of distinctive digital personas. Graph base 122 may include node-based graphs, for example. Those graphs may be multi-dimensional, for example, and may include edges representing relationships between the digital persona and the people, characters, objects, actions, or locations inhabiting the world of the digital persona represented by the nodes of the node-based graph. Graph base 122 may include node-based graphs each corresponding respectively to one of tens, hundreds, or thousands of distinctive digital personas.

Although the present application refers to ML model 108 and ML model training pipeline 130 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, in some implementations, system 100 may utilize a decentralized secure digital ledger in addition to system memory 106. Examples of such decentralized secure digital ledgers may include a blockchain, hashgraph, directed acyclic graph (DAG), and Holochain® ledger, to name a few. In use cases in which the decentralized secure digital ledger is a blockchain ledger, it may be advantageous or desirable for the decentralized secure digital ledger to utilize a consensus mechanism having a proof-of-stake (POS) protocol, rather than the more energy intensive proof-of-work (PoW) protocol.

It is further noted that although FIG. 1 depicts ML model training pipeline 130 as being stored in its entirety in a single instance of system memory 106, that representation is also merely provided as an aid to conceptual clarity. More generally, system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within system 100. Consequently, in some implementations, the various components of ML model training pipeline 130 may be stored remotely from one another on the distributed memory resources of system 100. Furthermore, although FIG. 1 depicts database 118, knowledge base 120 and graph base 122 as being one or more remote resources accessible by system 100 communication network 110 and network communication links 112, in some implementations, one or more of database 118, knowledge base 120 and graph base 122 may be a component or components of system 100 and may be stored within system memory 106.

Hardware processor 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs from system memory 106, while a GPU may be implemented to reduce the processing overhead of the CPU by performing computationally intensive graphics or other processing tasks. A TPU is an application-specific integrated circuit (ASIC) configured specifically for AI applications such as machine learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth®, for instance. Furthermore, in some implementations, system 100 may be implemented virtually, such as in a data center. For example, in some implementations, system 100 may be implemented in software, or as virtual machines. Moreover, in some implementations, communication network 110 may be a high-speed network suitable for high performance computing (HPC), for example a 10 GigE network or an Infiniband network.

Figure 2:
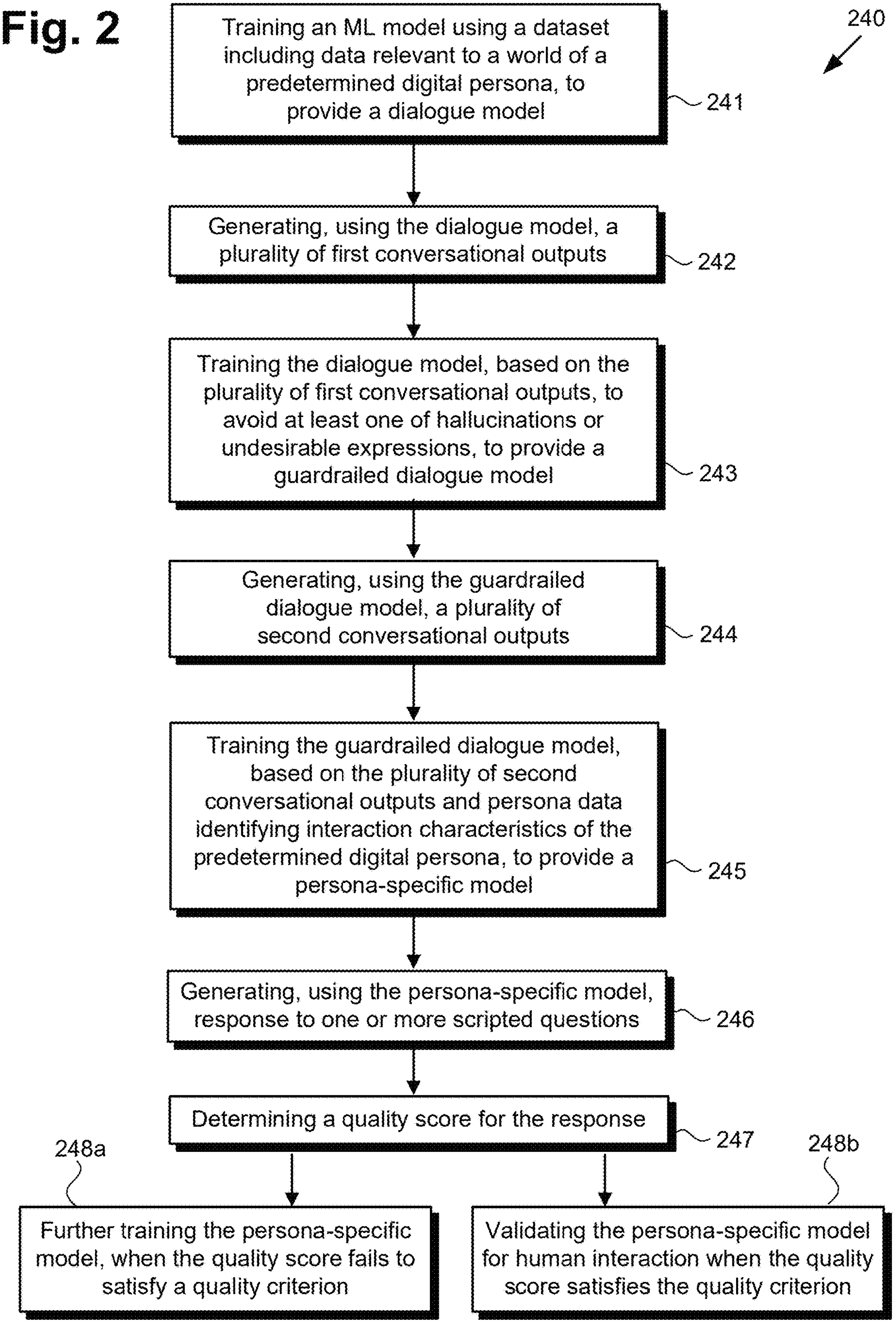
FIG. 2 shows a flowchart presenting an exemplary method for performing ML model-based generation of digital personas, according to one implementation.
Figure 3:
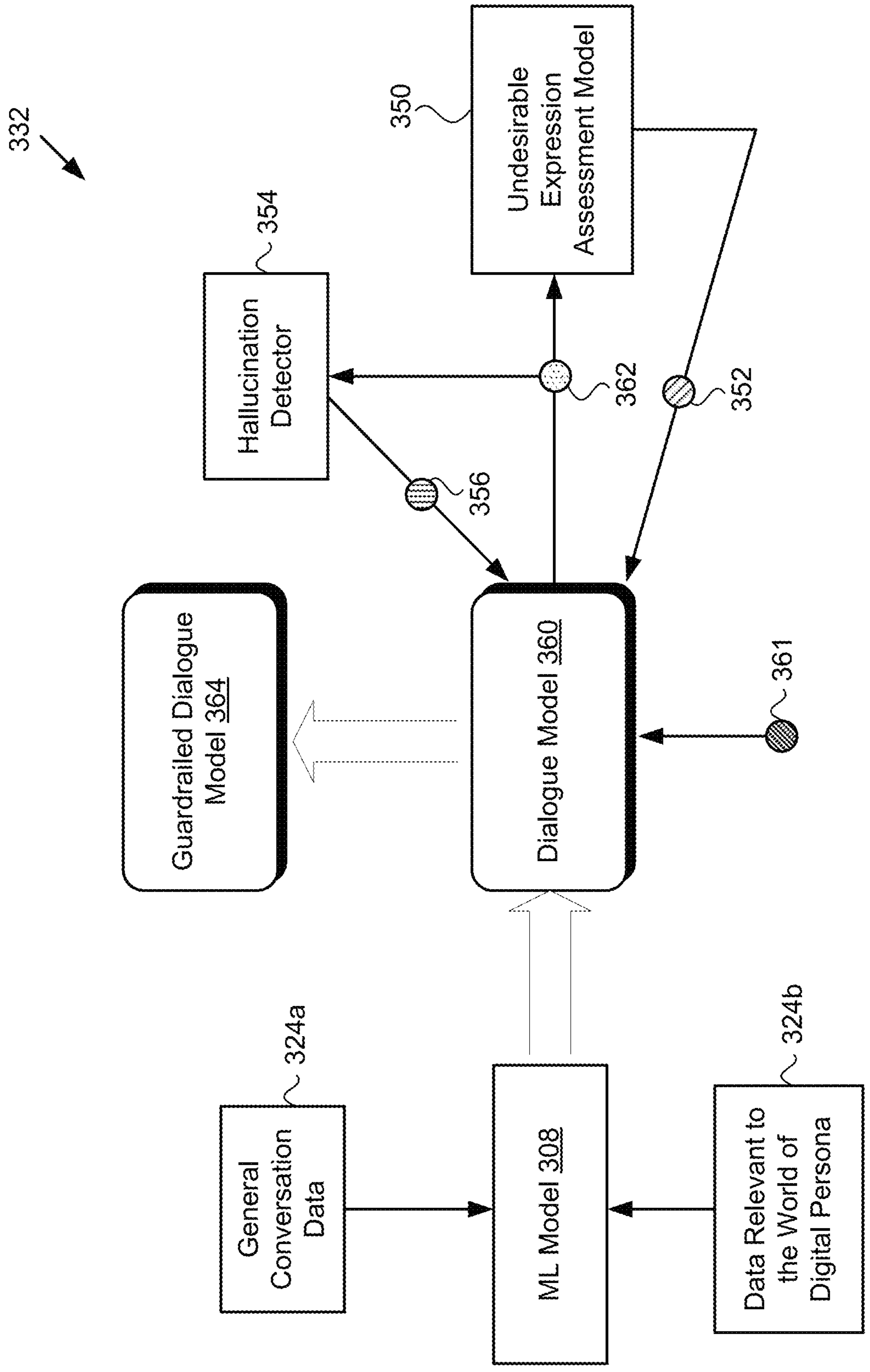
FIG. 3 shows a conceptual diagram of a portion of a pipeline for training an ML model to generate digital personas, used in a first training stage of the ML model, according to one implementation.
Figure 4:
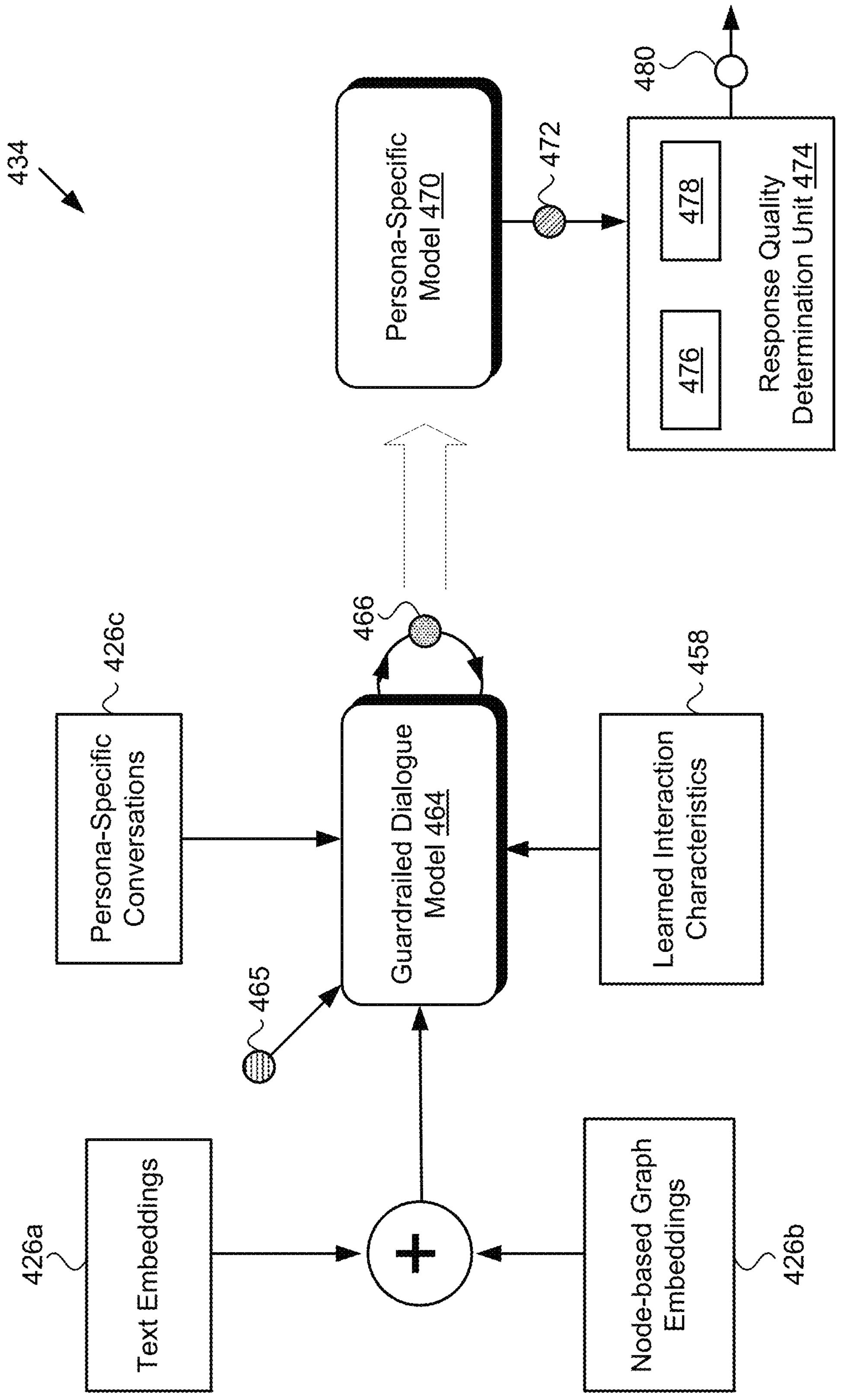
FIG. 4 shows a conceptual diagram of another portion of the pipeline for training an ML model to generate digital personas, used in a second training stage of the ML model, according to one implementation.

The two-stage process for training ML model 108 disclosed by the present application, as well as the functionality of ML model training pipeline 130, when used by hardware processor 104 of system 100, in FIG. 1, will be further described by reference to FIGS. 2, 3 and 4. FIG. 2 shows flowchart 240 presenting an exemplary method for performing ML model-based generation of digital personas, according to one implementation. FIG. 3 shows conceptual diagram 332 of a portion of ML model training pipeline 130, in FIG. 1, used in a first training stage of ML model 308, according to one implementation, while FIG. 4 shows conceptual diagram 434 of another portion of ML model training pipeline 130 used in a second training stage, according to one implementation. With respect to the method outlined in FIG. 2, it is noted that certain details and features have been left out of flowchart 240 in order not to obscure the discussion of the inventive features in the present application. It is further noted that ML model 308, in FIG. 3, corresponds in general to ML model 108, in FIG. 1. Thus, ML model 308 may share any of the characteristics attributed to ML model 108 by the present disclosure, and vice versa.

Referring to FIG. 2, with further reference to FIGS. 1 and 3, flowchart 240 includes training ML model 108/308 using dataset 124 including data **324*b* relevant to a world of a predetermined digital persona, to provide dialogue model 360 (action 241). As noted above, ML model 108/308 may be a pre-trained generic ML model including less than eight billion parameters, making ML model 108/308 orders of magnitude smaller than conventional LLMs. ML model 108/308 may itself be a pre-trained generic LLM. Furthermore, in some implementations, ML model 108/308** may be a Transformer-based model.

Dataset 124 includes data **324*b* relevant to the world of the predetermined digital persona to be emulated using ML model 108/308. That predetermined digital persona may be a digital assistant, such as a customer service representative or a technical support agent, for example, or may be a digital representation of a human being or fictional character. Data 324*b* may include conversation samples referencing one or more of people, objects, actions, or locations inhabiting the world of the predetermined digital persona to be emulated using ML model 108/308. In addition, dataset 124 may include general conversation data 324*a***, which may provide generic conversation samples not associated with the predetermined digital character per se.

As shown in FIG. 1, in some implementations dataset 124 may be obtained by system 100 from database 118, via communication network 110 and network communication links 112. Training of ML model 108/308 using dataset 124 to provide dialogue model 360, in action 241, may be performed by hardware processor 104 of system 100, using ML model training pipeline 130.

It is noted that the training performed in action 241 can be used to take ML model 108/308 in the form of a small pre-trained generic LLM and train it on general conversation data **324*a* to learn to engage in conversation. It is further noted that general conversation data 324*a* is used to train ML model 108/308 on dialogues, rather than on prompt completion. ML model 108/308 can then be further trained as part of action 241 using data 324*b* relevant to the world of the predetermined digital persona. This further training enables dialogue model 360** to understand different people, characters, locations and objects within the world of the digital persona to create a more relatable digital persona.

Continuing to refer to FIG. 2 in combination with FIGS. 1 and 3, flowchart 240 further includes generating, using dialogue model 360, multiple first conversational outputs 362 (action 242). First conversational outputs 362 may include responses generated by dialogue model 360 to sample dialogue 361 provided as inputs to dialogue model 360. The generation of first conversational outputs 362 using dialogue model 360, in action 242, may be performed by hardware processor 104 of system 100, using ML model training pipeline 130.

Continuing to refer to FIG. 2 in combination with FIGS. 1 and 3, flowchart 240 further includes training dialogue model 360, based on first conversational outputs 362, to avoid one or both of hallucinations and undesirable expressions, to provide guardrailed dialogue model 364 (action 243). The training performed in action 243 is directed to reducing the generation of toxic or otherwise undesirable expressions as well as to reducing hallucinations by dialogue model 360. One approach to doing so is to include samples of desirable and undesirable dialog in sample dialogue 361 provided as inputs to dialogue model 360 and to perform automatic scoring of how undesirable first conversational outputs 362 are, as well as to determine the propensity by dialogue model 360 to hallucinate when generating first conversational outputs 362.

The undesirability of first conversational outputs 362 may be assessed using undesirable expression assessment model 350 in the form of an ML model trained to detect undesirable expressions at both the word level and a more abstract intent level, such as detecting sarcasm, bullying and the like, and to output undesirability score 352 corresponding to the undesirableness of each of first conversational outputs 362. Hallucination score 356 may be determined using hallucination detector 354 based on an evaluation metric such as the Bilingual Evaluation Understudy (BLEU) metric to score how close first conversational outputs 362 are to their respective labeled target outputs. Dialogue model 360 may be trained in action 243 using reinforcement learning, where the reward is inversely proportional to the sum of undesirability score 352 and hallucination score 356. The training of dialogue model 360 to avoid one or both of hallucinations and undesirable expressions, in action 243, may be performed by hardware processor 104 of system 100, using ML model training pipeline 130.

Referring to FIG. 2 in combination with FIGS. 1 and 4, flowchart 240 further includes generating, using guardrailed dialogue model 464, multiple second conversational outputs 466 (action 244). It is noted that guardrailed dialogue model 464 corresponds in general to guardrailed dialogue model 364, in FIG. 3. Thus, guardrailed dialogue model 464 may share any of the characteristics attributed to guardrailed dialogue model 364 by the present disclosure, and vice versa.

Second conversational outputs 466 may include conversation generated by guardrailed dialogue model 464 in response to conversational prompts 465 provided as inputs to guardrailed dialogue model 464. The generation of second conversational outputs 466 using guardrailed dialogue model 464, in action 244, may be performed by hardware processor 104 of system 100, using ML model training pipeline 130.

Continuing to refer to FIG. 2 in combination with FIGS. 1 and 4, flowchart 240 further includes training guardrailed dialogue model 464, based on second conversational outputs 466 and persona data 126 identifying interaction characteristics of the predetermined digital persona, to provide persona-specific model 470 (action 245). The training of guardrailed dialogue model 464 to provide persona-specific model 470, in action 245, may be performed by hardware processor 104 of system 100, using ML model training pipeline 130.

As shown in FIG. 1, persona data 126 may be obtained by system 100 from one or more of database 118, knowledge base 120 and graph base 122 via communication network 110 and network communication links 112. Referring to FIGS. 1 and 4 in combination, persona data 126 may include text embeddings 426*a* obtained from one or both of database 118 and knowledge base 120 and node-based graph embeddings 426*b* obtained from graph base 122. As shown in FIG. 4, in some implementations text embeddings and node-based graph embeddings 426*b* may be concatenated to train guardrailed dialogue model 464.

Persona data 126 on which training of guardrailed dialogue model 464 to provide persona-specific model 470 is based may also include persona specific conversations 426*c*, obtained from closed captions or subtitles stored on database 118 for example, as well as a character archetype of the digital persona and other traits of the digital persona. Moreover, in some implementations, persona-specific model 470 may be further enhanced by training guardrailed dialogue model 464 using learned interaction characteristics of the digital persona to be emulated by persona-specific model 470, inferred during the training of guardrailed dialogue model 464.

It is noted that, as defined in the present application, the feature "character archetype" refers to a template or other representative model providing an exemplar for a particular personality type. That is to say, a character archetype may be affirmatively associated with some personality traits while being dissociated from others. By way of example, the character archetypes "hero" and "villain" may each be associated with substantially opposite traits. While the heroic character archetype may be valiant, steadfast, and honest, the villainous character archetype may be unprincipled, faithless, and greedy. As another example, the character archetype "sidekick" may be characterized by loyalty, deference, and perhaps irreverence.

Continuing to refer to FIG. 2 in combination with FIGS. 1 and 4, flowchart 240 further includes generating, using persona-specific model 470 a response to each of one or more scripted questions to provide one or more responses 472 (action 246). The one or more scripted questions to which persona specific model 470 responds, in action 246, may be associated with predetermined target answers that are both compatible with the personality of the digital persona and provide a substantively satisfactory answer to the scripted question. Action 246 may be performed by hardware processor 104 of system 100, using ML model training pipeline 130.

Continuing to refer to FIG. 2 in combination with FIGS. 1 and 4, flowchart 240 further includes determining quality score 480 for one or more responses 472 generated using persona-specific model 470 in action 246 (action 247). Action 247 may be performed using response quality determination unit 474 of ML model training pipeline 130. Quality score may be determined by comparing the keywords of the target answers for the one or more scripted questions to which persona-specific model 470 responds, in action 246, with one or more responses 472.

Quality score 480 may be based on a combination of character compatibility score 476 and answer satisfaction score 478, and may be the median or mean of a weighted or unweighted sum of character compatibility score 476 for each response and answer satisfaction score 478 for that response, for example. Quality score 480 may be determined, in action 247, by hardware processor 104 of system 100, using ML model training pipeline 130.

Continuing to refer to FIG. 2 in combination with FIGS. 1 and 4, in some use cases flowchart 240 may include further training persona-specific model 470, when quality score 480 fails to satisfy a quality criterion (action 248*a*). The quality criterion to which quality score 480 is compared may be a minimum satisfactory quality score, which may be predetermined for example, such that any quality score less than that minimum threshold fails to satisfy the quality criterion. When quality score 480 fails to satisfy the quality criterion, combined character compatibility score 476 and answer satisfaction score 478 can be used to train persona-specific model 470 as a reinforcement learning reward optimization model using all scores to avoid the necessity for human intervention in training. Action 248*a*, when performed as part of the method outlined by flowchart 240, may be performed by hardware processor 104 of system 100, using ML model training pipeline 130. It is noted that action 248*a* only occurs when quality score 480 determined in action 247 fails to satisfy the quality criterion. Otherwise, the method outlined by flowchart 240 may transition from action 247 directly to action 248*b*.

Thus, in some use cases flowchart 240 may continue and conclude with validating persona-specific model 470 for human interaction when quality score 480 satisfies the quality criterion (action 248*b*). Action 248*b* may be performed by hardware processor 104 of system 100, using ML model training pipeline 130. It is noted that persona-specific model 470, once fully trained, may take the form of a multi-modal foundation model. It is further noted that, in some implementations persona-specific model 470 may be a multi-persona model configured to engage in dialogue using a selectable one of multiple different digital personas. That is to say, persona-specific model 470 may be a multi-persona model capable of emulating a first digital persona when interacting with a first user, emulating a second digital persona when interacting with a second user, and so forth.

Moreover, in some implementations, persona-specific model 470 may be a multi-persona model configured to engage in dialogue using multiple different digital personas contemporaneously. In these implementations, for example, persona specific model 470 may be capable of contemporaneously generating multiple distinct digital personas that interact with one another as well as with one or more human users.

Figure 5:
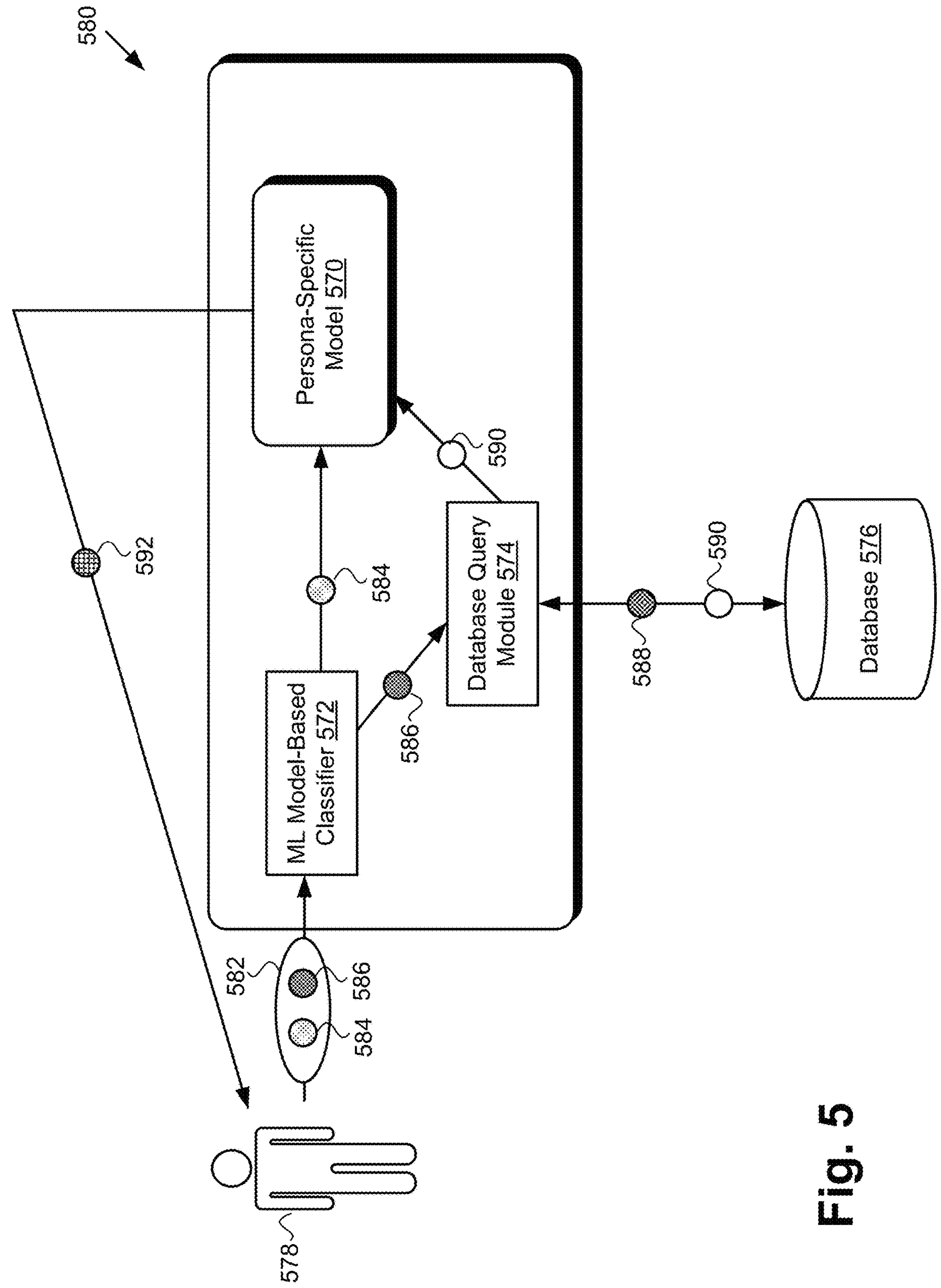
FIG. 5 shows a persona-specific model trained to emulate one or more digital personas, deployed as a component of an exemplary artificial intelligence (AI) interaction model, according to one implementation.

FIG. 5 shows persona-specific model 570 trained to emulate one or more digital personas, deployed as a component of exemplary AI interaction model 580, according to one implementation. It is noted that persona-specific model 570 corresponds in general to persona-specific model 470, in FIG. 4. Consequently, persona-specific model 570 may share any of the characteristics attributed to persona-specific model 470 by the present disclosure, and vice versa.

As shown in FIG. 5, persona-specific model 570 may be implemented as part of AI interaction model 580 in combination with ML model-based classier 572 and database query module 574. As further shown in FIG. 5, AI interaction model 580 receives input 582 from user 578 and outputs persona-specific response 592 using persona-specific model 570. Also shown in FIG. 5 are conversational component 584 of input 582, language-based request 586 included in input 582, database query 588, query response 590 and database 576.

According to the exemplary implementation shown in FIG. 5, AI interaction model 580 uses ML model-based classifier 572 to receive input 582 including either or both of conversational component 582 and language-based request 586. ML model-based classifier 572 is trained to distinguish between conversational component 584 and language-based request 586. In use cases in which input 582 includes conversational component 584, conversational component 584 is transferred directly to persona-specific model 570 for generation of a persona-specific reply consistent with a digital persona being emulated by persona-specific model 570. In use cases in which input 582 includes language-based request 586, language-based request 586 is transferred to database query module 574 configured to convert language-based request 586 to database query (sql/nonsql) 588 and retrieve data 590 from database 576, which may be a proprietary database for example. In use cases in which input 582 includes language-based request 586, retrieved data 590 may be combined with the persona-specific reply generated by persona-specific model 570 and be output to user 578 as persona-specific response 592.

It is noted that use of ML model-based classifier 572 and database query module 574 in combination with persona-specific model 570 advantageously allows persona-specific model 570 to be implemented as a relatively small LLM while concurrently enhancing the database search capabilities of AI interaction model 580.

With respect to the method outlined by FIG. 2, it is emphasized that actions 241, 242, 243, 244, 245, 246, 247 and 248*a*, or actions 241, 242, 243, 244, 245, 246, 247 and 248*b*, may be performed in an automated process from which human involvement may be omitted.

Thus, the present application discloses systems and methods for performing ML model-based generation of digital personas that address and overcome the deficiencies in the conventional art. The present ML model-based digital persona generation solution advances the state-of-the-art by introducing a two-stage training framework in which the ML model size and training time can advantageously be substantially reduced when compared to training a conventional LLM having more than one hundred billion parameters. Moreover, using a relatively small pre-trained LLM on which to perform digital persona specific dialogue training also advantageously avoids the higher susceptibility to toxicity of larger LLMs.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:

a hardware processor, and a memory storing a machine learning (ML) model training pipeline;

the hardware processor configured to execute the ML model training pipeline to:

train an ML model using a dataset including data relevant to a world of a predetermined digital persona, to provide a dialogue model;

generate, using the dialogue model, a plurality of first conversational outputs;

train the dialogue model, based on the plurality of first conversational outputs, to avoid at least one of hallucinations or undesirable expressions, to provide a guardrailed dialogue model;

generate, using the guardrailed dialogue model, a plurality of second conversational outputs;

train the guardrailed dialogue model, based on the plurality of second conversational outputs and persona data identifying interaction characteristics of the predetermined digital persona, to provide a persona-specific model;

generate, using the persona-specific model, a response to a scripted question;

determine a quality score for the response;

further train the persona-specific model, when the quality score fails to satisfy a quality criterion, or validate the persona-specific model for human interaction when the quality score satisfies the quality criterion.

2. The system of claim 1, wherein the ML model comprises less than eight billion parameters.

3. The system of claim 2, wherein the ML model comprises a large language model.

4. The system of claim 2, wherein the ML model comprises a Transformer-based model.

5. The system of claim 1, wherein the persona-specific model comprises a multi-modal foundation model.

6. The system of claim 1, wherein the persona-specific model comprises a multi-persona model configured to engage in dialogue using (i) a selectable one of a plurality of different digital personas, or (ii) a plurality of different digital personas contemporaneously.

7. The system of claim 1, wherein the persona-specific model is deployed in combination with at least one of a machine learning model-based classifier trained to distinguish between conversation and a language-based request or a database query module configured to convert the language-based request to a database query.

8. The system of claim 1, wherein the predetermined digital persona is one of a digital assistant, a digital representation of a human being, or a digital representation of a fictional character.

9. The system of claim 1, wherein the dataset used to train the ML model to provide the dialogue model includes generic conversation samples and conversation samples referencing at least one of people, objects, actions, or locations inhabiting the world of the predetermined digital persona.

10. The system of claim 1, wherein the dialogue model is trained to provide the guardrailed dialogue model using a first reinforcement learning, and wherein when the quality score fails to satisfy the quality criterion the persona-specific model is further trained using a second reinforcement learning.

11. A method for use by a system including a hardware processor, and a memory storing a machine learning (ML) model training pipeline, the method comprising:

training an ML model, by the hardware processor using the ML model training pipeline and a dataset including data relevant to a world of a predetermined digital persona, to provide a dialogue model;

generating, by the hardware processor using the ML model training pipeline and the dialogue model, a plurality of first conversational outputs;

training the dialogue model, by the hardware processor using the ML model training pipeline based on the plurality of first conversational outputs, to avoid at least one of hallucinations or undesirable expressions, to provide a guardrailed dialogue model;

generating, by the hardware processor using the ML model training pipeline and the guardrailed dialogue model, a plurality of second conversational outputs;

training the guardrailed dialogue model, by the hardware processor using the ML model training pipeline based on the plurality of second conversational outputs and persona data identifying interaction characteristics of the predetermined digital persona, to provide a persona-specific model;

generating, by the hardware processor using the ML model training pipeline and using the persona-specific model, a response to a scripted question;

determining, by the hardware processor using the ML model training pipeline, a quality score for the response;

further training the persona-specific model, by the hardware processor using the ML model training pipeline when the quality score fails to satisfy a quality criterion, or validating the persona-specific model for human interaction by the hardware processor using the ML model training pipeline when the quality score satisfies the quality criterion.

12. The method of claim 11, wherein the ML model comprises less than eight billion parameters.

13. The method of claim 12, wherein the ML model comprises a large language model.

14. The method of claim 12, wherein the ML model comprises a Transformer-based model.

15. The method of claim 11, wherein the persona-specific model comprises a multi-modal foundation model.

16. The method of claim 11, wherein the persona-specific model comprises a multi-persona model configured to engage in dialogue using (i) a selectable one of a plurality of different digital personas, or (ii) a plurality of different digital personas contemporaneously.

17. The method of claim 11, wherein the persona-specific model is deployed in combination with at least one of a machine learning model-based classifier trained to distinguish between conversation and a language-based request or a database query module configured to convert the language-based request to a database query.

18. The method of claim 11, wherein the predetermined digital persona is one of a digital assistant, a digital representation of a human being, or a digital representation of a fictional character.

19. The method of claim 11, wherein the dataset used to train the low model to provide the dialogue model includes generic conversation samples and conversation samples referencing at least one of people, objects, actions, or locations inhabiting the world of the predetermined digital persona.

20. The method of claim 11, wherein the dialogue model is trained to provide the guardrailed dialogue model using a first reinforcement learning, and wherein when the quality score fails to satisfy the quality criterion the persona-specific model is further trained using a second reinforcement learning.

* * * * *